Patented Aug. 23, 1932

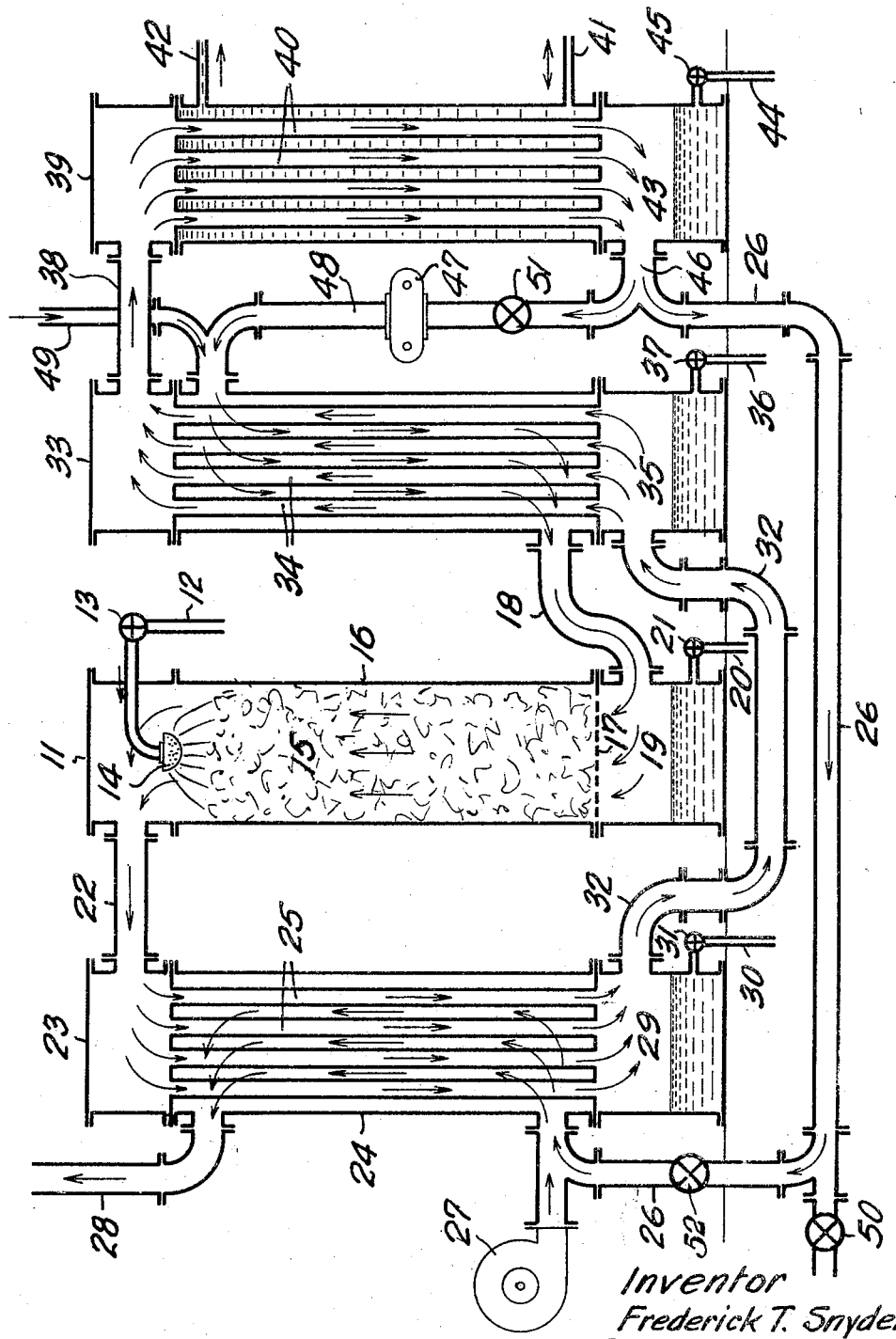

1,872,839

UNITED STATES PATENT OFFICE

FREDERICK T. SNYDER, OF BOSTON, MASSACHUSETTS

HYDROGENATION OF HYDROCARBONS AND APPARATUS THEREFOR

Application filed December 16, 1925, Serial No. 75,796, and in Canada March 6, 1925. Renewed July 5, 1932.

This invention relates broadly to the treatment of hydrocarbons of relatively high boiling temperatures for the production therefrom of hydrocarbons of lower boiling temperatures, and the primary object of the invention is to produce the lower boiling from the higher boiling material easily, inexpensively and in as nearly as possible the theoretical amount based on the carbon content of the higher boiling material.

Another object of the invention is to operate in such a manner as to avoid as far as possible the production of permanent gas.

Various other objects and the advantages of the invention may be ascertained from the following description.

The process operates primarily by the addition of hydrogen to the molecules of the materials being treated. In general, the material is vaporized at a low temperature, well below its temperature of cracking or decomposition, by evaporating the material into a relatively large volume of gas consisting mostly of free hydrogen.

After evaporation, the mixture of the vapor of the material and the hydrogen gas is raised to a temperature at which hydrogen is absorbed into the molecules of the material, and at which decomposition of the molecules occurs with formation of a greater number of molecules, the majority of which will constitute material of lower boiling temperature, such increased temperature being nevertheless below the cracking temperature of the produced lower boiling material. In other words, upon heating the material in presence of hydrogen, the molecules of the material are cracked and form a larger number of molecules, most of which have by the addition of hydrogen a higher proportion of hydrogen than the original molecules. These new high hydrogen molecules form materials with lower boiling temperatures than the original material. By controlling the temperature, the composition of the newly formed molecules may be regulated to a considerable extent and, in this way, the nature of the product may be governed. The relatively large volume of gas used ensures an efficient rate of operation and, what is of greater importance, ensures a sufficient reduction in the partial pressures of the original material to enable evaporation below the decomposition temperature thereof. The increase in the number of molecules, resulting from heating and hydrogenation, increases the partial pressures sufficiently for separation of the produced material from the gas to be easily effected by condensation at temperatures which can be readily and inexpensively maintained on a commercial scale.

The accompanying diagrammatic drawing illustrates one arrangement of equipment suitable for carrying this process into effect. The material to be treated enters the vaporizer 11 through a pipe 12 controlled by a valve 13, and is sprayed by a nozzle or sprinkler 14 over a filling 15, which consists of refractory rings or other material not affected by the material being treated. This filling is contained in a gas-tight shell 16 and is supported by a screen 17. Hot gas, high in free hydrogen, enters this shell below the screen through a pipe 18 and passes up through the filling 15 and in contact with the material from the nozzle 14, flowing down over the surfaces of the filling 15. The volume and temperature of the gas is such that most of the liquid is evaporated as it flows down in contact with the gas. Any material not evaporated collects in a reservoir 19 in the base of the shell 16 and can be removed through a pipe 20 controlled by a valve 21.

The mixture of hydrogen gas and the vapor of the evaporated material passes from the vaporizer 11, through a pipe 22 to hydrogenator 23, consisting of a shell 24 containing tubes 25. These tubes are heated on the outside by gas supplied through a pipe 26 and burned with air from a blower 27. The hot products of combustion are circulated around the tubes and removed eventually through a pipe 28. The mixture of hydrogen and vapor passes down inside the tubes 25 and is heated above the temperature at which some of the hydrogen is absorbed by the molecules of the vapor. Any vapor which may comdense in the vaporizer is collected as liquid in a reservoir 29 in the base of the vaporizer 23 and can be removed through a pipe 30 controlled by a valve 31.

The mixture of hydrogenated vapor and hydrogen gas passes from the hydrogenator 23 through a pipe 32 into the base of a heat exchanger 33. The hot mixture passes upwardly inside the tubes 34 of the heat exchanger and is partially cooled by cool gas circulating outside the tubes. The higher boiling temperature portions of the hydrogenated vapor are condensed by this cooling and run down the insides of the tubes 34 and accumulate in a reservoir 35 in the base of the exchanger, from which this higher boiling temperature portion can be removed through a pipe 36 controlled by a valve 37.

The mixture of partially cooled gas and the remaining vapor pass from the exchanger 33 through a pipe 38 into a condenser 39, in which the mixture is further cooled by passing through tubes 40 surrounded by water, which is introduced cold through a pipe 41 and removed, when heated, through a pipe 42. In this condenser, the cooling of the mixture changes most of the vapor to liquid, which condenses in the tubes and runs down into a reservoir 43 in the base of the condenser 39, from which this portion can be removed by means of a pipe 44, controlled by a valve 45.

The cooled gas remaining after the condensation of the vapor passes from the condenser 39 through a pipe 46. This gas separates into two portions. One portion goes through the pipe 26 and is used as fuel to heat the hydrogenator 23. The other portion is pulled through an exhauster blower 47 and sent forward through a pipe 48 to act as the cooling gas in the exchanger 33. The gas removed from the circulation through the pipe 26 is made up by fresh hydrogen gas added to the circulation through pipe 49. By this removal and addition, the impurities of the hydrogen gas are prevented from accumulating in the system and lowering the concentration of the hydrogen, which is normally kept above 95% by volume, but which may be as low as 50%. This operation can be carried on with the hydrogen gas under high pressure, (for example 100 lbs. per square inch) so that the concentration of the hydrogen with reference to the vapor will be increased and the speed of the hydrogenation greatly increased. It will be understood, however, that pressures may be used down to atmospheric or as much above 100 pounds as practicable commercially and safely. The amount of hydrogen present with the vapor is in any case much greater than that required for complete hydrogenation of the vapor. Any suitable means for controlling flow of gas through the pipe 26, such as a valve 52, will serve to retain pressure in the apparatus.

Passing the cool gas around the tubes of the heat exchanger heats the gas and this heated gas passes from the exchanger through the pipe 18 and serves once again to evaporate material in the vaporizer 11. It is an essential feature of this invention that the volume of gas so circulated is so large that the resulting partial pressure of the vapor of the material being treated is so low that the resulting temperature of vaporization is below the temperature at which the material decomposes. In practice of this invention, the volume of hydrogen gas is in excess of three times the amount required to prevent decomposition in the vaporizer, and therefore many times the volume of vapor produced from the material, usually in excess of fifty times.

The supply of fresh gas to the circulation contains enough hydrogen to replace that absorbed and that burned or discharged from the system. If any permanent gas is evolved from the material being cracked, the discharge of gas must be correspondingly increased to maintain the amount in circulation approximately constant. Any such discharge must be accompanied by compensating hydrogen supply to maintain the composition of the gas approximately constant. Any material increase in the amount of gas in circulation would be beneficial as regards evaporation, but would upset the thermal balance of the system. Regulation of gas discharge may be effected by means of a valve 50 in the pipe 26, while the temperature in the evaporator may be controlled partly by a valve 51 regulating the admission of warm gas thereto and partly by regulating the admission of air to the combustion in the heater 23. If desired, the waste gas leaving through the flue 28 may be passed through a stove to preheat the air supplied to the heater 23.

As hydrogen is absorbed in the hydrogenator by the molecules of high boiling temperature, there results from the combined effects of hydrogenation and heating several molecules of lower boiling temperature for each molecule hydrogenated. This represents a corresponding increase in the volume of the vapor and an equivalent increase in the partial pressure of the vapor. Any unhydrogenated vapor, condensing out due to this increase of the partial pressure of the vapor, is caught in the reservoir 29 of the hydrogenator 23 and may be returned for retreatment through pipe 12 to the vaporizer 11. This increase of partial vapor pressure also improves condensing conditions in the condenser 39. Were it not for the increase in the number of molecules due to hydrogenation and cracking, the very low partial pressure of the original vapor would necessitate a very low condensing temperature, probably sub-zero, but by reason of the increased number of molecules and increased partial pressure of the produced low boiling material the desired condensation may be effected at temperatures easily and cheaply maintained in commercial operations.

The liquid that condenses in the reservoir 35 of the exchanger 33 is usually still too high in boiling temperature for retention as a final product, and may be subjected to re-evaporation and further hydrogenation.

A convenient way to obtain the gas of high hydrogen content used in this process is by cracking natural gas at a high temperature and removing the resulting free carbon.

Purposely, the process has not been heretofore identified with the treatment of any particular material, for the reason that a great variety of materials may be treated along the lines indicated with, perhaps, modifications or additions peculiar to the material. Crude petroleum, either asphalt or paraffin base, may be treated substantially as described for the production of gasoline and other normally liquid or readily liquefiable hydrocarbons may be similarly treated. For the treatment of other materials, such as bituminous sand, oil shale, bark, sawdust, garbage, peat, lignite or even coal, which are normally solid, suitable means must be provided for handling the material in the evaporating step, with, of course, the employment in this step of temperatures and pressures suitable for the material. Since temperature, pressure and relative volume of hydrogen most suitable for any given material can be determined only by examination of the material, these details have been stated only in general terms applicable to any and all classes of material susceptible of treatment according to this invention, and it will therefore be understood that the invention is not limited to any precise temperature, pressure or relative amount of hydrogen.

Having thus described my invention, what I claim is:—

1. A process of producing low boiling hydrocarbons from higher boiling hydrocarbons, including the steps of heating and evaporating the higher boiling hydrocarbons by contact with gas heated to a temperature below the cracking temperature of said higher boiling hydrocarbons, the volume of said gas being such that it will constitute over 90 per cent of the volume of the gas and vapour mixture that will be produced by evaporation of said higher boiling hydrocarbons into said gas, the gas containing in excess of fifty per cent of free hydrogen by volume; and cracking said vapours by heating the gas and vapours to a temperature above the cracking temperature of said vapours while maintaining a pressure between atmospheric pressure and approximately one hundred pounds per square inch.

2. A process of producing low boiling hydrocarbons from higher boiling hydrocarbons, including the steps of heating and evaporating the higher boiling hydrocarbons by contact with gas heated to a temperature below the cracking temperature of the said higher boiling hydrocarbons, said gas containing a volume of free hydrogen in excess of five times the volume of the vapours that will be present in the mixture produced by evaporation of said higher boiling hydrocarbons into said gas.

3. A process of producing gasoline from hydrocarbon oil of higher boiling points, which comprises vaporizing the oil of higher boiling point by filming it and contacting it with a gas preheated to a temperature below the cracking temperature of the oil, removing said gas and the vapours and subsequently cracking said vapours by heating said gas and vapours to a temperature above the cracking temperature of the vapours at a pressure between atmospheric and approximately 100 pounds per square inch, said gas containing a volume of free hydrogen of between five and fifty times the volume of hydrocarbon vapour in the mixture passing from the vaporization step and causing a part of said hydrogen to combine with said cracked vapour, then cooling said gas and the vapour resulting from such cracking and hydrogen absorption to condense the gasoline formed, after first removing the vapour of uncracked oil by a partial cooling.

4. A process of producing gasoline from hydrocarbon oils of higher boiling temperature, which comprises heating and vaporizing the oil by contacting it with a gas preheated to a temperature below the cracking temperature of the oil, removing said gas and the admixed oil vapours and subequently cracking the oil vapours by heating the gas and oil vapours to a temperature above the cracking temperature of the oil vapours at a pressure between atmospheric pressure and approximately 100 pounds per square inch, said gas containing a volume of free hydrogen of between five and fifty times the volume of hydrocarbon vapour in the mixture passing from the vaporization step and causing a part of said hydrogen to combine with said cracked vapour, then cooling said gas and the vapour resulting from such cracking and hydrogen absorption to condense the gasoline formed, after first removing the vapour of uncracked oil by partial cooling, and subsequently renewing the hydrogen proportion of said gas and re-using said gas to vaporize additional oil.

5. A process of producing low boiling hydrocarbons from higher boiling hydrocarbons in which process the high boiling hydrocarbons are heated and evaporated at a low partial pressure by contact with gas heated to a temperature below the cracking temperature of said high boiling hydrocarbons, said gas containing in excess of five volumes of free hydrogen for each volume of high boiling hydrocarbon vapour in the gas and vapour mixture resulting from the evaporation, increasing the partial pressure partly by reducing the average molecular weight of said vapour by cracking said vapour by heating the gas and high boiling vapour to a temperature above the cracking temperature of the high boiling vapour while maintaining a pressure between atmospheric pressure and approximately 100 pounds per square inch, the aforesaid increase of partial pressure being effected partly by reducing the volume of said gas by causing hydrogen to combine with the vapour and subsequently condensing the vapours at said increased partial pressure by cooling gas and vapours therein.

6. A process of producing low boiling hydrocarbons from higher boiling hydrocarbons, in which process the high boiling hydrocarbons are heated and evaporated at a partial pressure less than one half of atmospheric pressure by contact with gas heated to a temperature below the cracking temperature of said high boiling hydrocarbons, said gas containing free hydrogen at a partial vapour pressure of more than double atmospheric pressure, increasing the partial pressure of said vapour and reducing the partial pressure of the hydrogen by causing said vapour to crack and absorb hydrogen by heating said gas and vapour to a temperature above the cracking temperature of the vapour while maintaining a pressure between atmospheric pressure and approximately 100 pounds per square inch and condensing the resulting hydrocarbon vapours at such increased partial pressure by cooling said gas and admixed vapours.

7. A process of producing low boiling hydrocarbons from higher boiling hydrocarbons, which comprises evaporating said higher boiling hydrocarbons at a temperature below the decomposition temperature of said hydrocarbons by contact with gas heated to a temperature below the decomposition temperature of the hydrocarbons, said gas containing free hydrogen at a partial pressure above nine pounds absolute, per square inch, and the partial pressure of said hydrocarbons as vapour in said gas being less than five pounds absolute per square inch, cracking said vapour by heating the vapour and gas above the cracking temperature of said vapour while maintaining a pressure between atmospheric pressure and approximately 100 pounds per square inch and condensing the hydrocarbon products of the cracking by cooling said gas and the vapours therein.

8. A process of making low boiling hydrocarbons from higher boiling hydrocarbons, which comprises evaporating the higher boiling hydrocarbons by contact with gas heated to a temperature below the cracking temperature of said high boiling hydrocarbons, the volume of said gas being such that it will constitute over ninety per cent of the volume of the gas and vapour mixture resulting from the evaporation of said higher boiling hydrocarbons into said gas, the gas containing in excess of fifty percent of free hydrogen by volume, and cracking said vapours by heating the gas and vapours to a temperature above the cracking temperature of said vapours while maintaining super-atmospheric pressure, and cooling the gas and contained vaporous cracking products sufficiently to condense the vaporous cracking products.

9. A process of producing low boiling hydrocarbons from higher boiling hydrocarbons, including the steps of heating and evaporating the higher boiling hydrocarbons by contact with gas heated to a temperature below the cracking temperature of the said higher boiling hydrocarbons, said gas containing a volume of free hydrogen in excess of five times the volume of the vapours that will be present in the mixture produced by evaporation of said higher boiling hydrocarbons into said gas, and cracking the hydrocarbon vapour in contact with said gas by heating the gas and vapour mixture to a temperature above the cracking temperature of the hydrocarbon vapours and below the cracking temperature of the lighter vapours which it is desired to produce.

10. A process of obtaining hydrocarbons of low boiling points from hydrocarbons of high boiling points, which comprises heating said hydrocarbons of high boiling points by contact with hot gas, the temperature of said gas being below the cracking temperature of the hydrocarbons of highest boiling points contained in said hydrocarbons of high boiling points and the volume of said gas being such that at the temperature of the gas the hydrocarbons of high boiling points will evaporate into the gas as hydrocarbon vapor during said contact, the contents of the gas in free hydrogen being greater than the amount of hydrogen required for the formation of hydrocarbons of low boiling points from the hydrocarbons of high boiling points; subsequently to said evaporation raising the temperature of the vapor and the gas to a degree at which the molecules of hydrocarbons of high boiling point in the vapor will divide with the absorption of part of the free hydrogen of the gas and the formation of hydrocarbons of low boiling points, the temperature to which said gas and vapor is raised being below the cracking temperature of the formed hydrocarbons of low boiling points; subsequently removing any untransformed hydrocarbons of high boiling points from the gas by cooling the gas to a temperature at which the vapor of any untransformed hydrocarbons condense while the major portion of the vapors of the hydrocarbons of low boiling points remain in the gas; and subsequently further cooling the gas to condense from the gas the hydrocarbons of low boiling points, then removing from the uncondensed gas a volume of gas such that the hydrogen in said removed gas added to the hydrogen absorbed is in the same ratio to the sum of said removed gas and said absorbed hydrogen as the hydrogen in the gas used for said evaporation is to the total of said gas.

11. An apparatus for the hydrogenation of hydrocarbons which includes a vaporizer having means to distribute the hydrocarbon in a thin film and to direct hot gases into contact with the filmed hydrocarbon, a heat exchanger, a condenser, a hydrogenator, connections between the vaporizer, heat exchanger, condenser and hydrogenator for circulating gas through the heat exchanger, vaporizer and hydrogenator and again through the heat exchanger following a path isolated from the first, through the condenser and back to the heat exchanger and hydrogenator, means for introducing hydrogen into the circulation and means for removing gas from the circulation and means for heating the material passing through the hydrogenator.

12. An apparatus for the hydrogenation of hydrocarbons which includes a vaporizer having means to distribute the hydrocarbon in a thin film and to direct hot gases into contact with the filmed hydrocarbon, a heat exchanger, a condenser, a hydrogenator, connections between the vaporizer, heat exchanger, condenser and hydrogenator for circulating gas through the heat exchanger, vaporizer and hydrogenator and again through the heat exchanger following a path isolated from the first, through the condenser and back to the heat exchanger, and means for heating material passing through the hydrogenator, means for withdrawing gas from the circulation for fuel in said heating means, and means for introducing hydrogen into the circulation.

13. Apparatus for hydrogenation of hydrocarbons which includes a vaporizer, means for introducing a hydrocarbon into said vaporizer, means for passing hot gas through the vaporizer in contact with the hydrocarbon therein to vaporize the hydrocarbon into said gas, a hydrogenator connected to the vaporizer to receive gas and vapour therefrom, means to heat the hydrogenator, a heat exchanger connected to the hydrogenator to receive hot gas and vapour therefrom and to heat gas flowing to the vaporizer, and a condenser connected to the heat exchanger to receive partially cooled gas and vapour therefrom and to return cooled gas to the exchanger for reheating, means to supply hydrogen into the system, means to withdraw surplus gas from the system, a pump to maintain circulation of gas and vapour in the system, and means to burn said withdrawn gas and deliver the hot combustion products to the hydrogenator to heat the same.

In witness whereof, I have hereunto set my hand.

FREDERICK T. SNYDER.